2,819,169
PROCESS OF FLAVORING AND PRODUCT

Jan Boldingh, Dordrecht, Netherlands, and Reginald James Taylor, Heswell, Wirral, England, assignors to Lever Brothers Company, New York, N. Y., a corporation of Maine No Drawing. Application August 6, 1953
Serial No. 372,801

38 Claims. (Cl. 99—123)

This invention relates to foodstuffs, particularly oleaginous foodstuffs, containing an additive to improve the flavor and other characteristics thereof.

Oleaginous foodstuffs containing oils and fats have long been used in the preparation of edible substances where flavor and aroma are important considerations. New methods or means by which the flavor of such foodstuffs may be improved in order to meet with greater favor among users and consumers are constantly being sought. Among the oleaginous foodstuffs margarine has acquired wide usage as a cooking condiment and spread and because of its increased usage the desire for improving the flavor of margarine has developed. One of the aspects of this desire has been the search for materials which will improve the taste of margarine to make it more butter-like.

It is an object of this invention to provide oleaginous foodstuffs having a butter-like flavor.

It is a further object of the invention to provide a method for imparting a butter-like flavor and aroma to oleaginous foodstuffs which ordinarily possess a non-butter-like flavor.

It is another object of the invention to provide a margarine which has a more butter-like flavor and aroma than ordinary margarine.

Another object of the invention is to provide a flavoring agent that is especially useful for imparting a butter-like flavor to oleaginous foodstuffs.

It is a principal object of the present invention to impart a butter-like flavor to oleaginous foodstuffs which do not by themselves possess a butter-like flavor by a method which does not involve the addition to the foodstuffs of butter or any other milk fat product inherently possessing a butter flavor. The term "oleaginous foodstuff" is used herein to denote a foodstuff of oily or fatty nature such as margarine, cooking or salad oils, such as corn or cottonseed oil, and hydrogenated cottonseed oil, lard and all other fats and oils of vegetable or animal body origin, artificial cream, ice cream, chocolate and confectionary.

According to this invention it has been found that a butter-like flavor results from the addition to an oleaginous foodstuffs other than butter of a minor proportion of a lactone of an aliphatic hydroxy acid, or mixture of lactones of such acids, said lactone having a lactone ring of from four to six carbon atoms, other than a lactone ring condensed to a hydrocarbon ring.

Wherever the expression "other than a lactone ring condensed to a hydrocarbon ring" is used in this specification the said "hydrocarbon ring" denotes an aromatic hydrocarbon ring.

The class of additives coming within the invention has the formula:

(I)  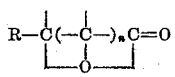

wherein $n$ is an integer from two to four and R is hydrogen or an aliphatic, alicyclic, mixed aliphatic-alicyclic, or mixed aliphatic-aromatic hydrocarbon radical having from one to about eight and preferably from three to eight carbon atoms and which may be either saturated or unsaturated and have a straight or a branched chain. To the free valences of the carbon atoms indicated there can be attached hydrogen or another R radical. The carbon atoms making up the

chain can include unsaturated carbon-to-carbon linkages or can be wholly saturated. Thus it will be seen that within the scope of the above formula there are included saturated lactones as well as unsaturated lactones in which there are one or more unsaturated carbon-to-carbon bonds either within or outside the lactone ring. Preferably the lactone contains from four to fourteen carbon atoms in all.

Representative radicals which R represents in the above formula include methyl, ethyl, propyl, butyl, pentyl, hexyl, heptyl, octyl, benzyl, phenylethyl, cyclopentyl, cyclohexyl, cyclopentylethyl, ethylene, propylene, butylene, pentylene, hexylene, heptylene, octylene, styryl, isopropyl, iso-octyl and the like.

In the case of the lactones of branched chain hydroxy carboxylic acids it has been found that good results are obtained when the branch carbon atom is attached to a carbon atom different from that to which the hydroxy group in the corresponding hydroxy acid is attached.

A preferred group of additives which fall within the above generic formula are the lactones having the formula:

(II)  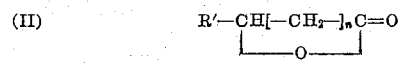

wherein $n$ is an integer from two to four and R' is a straight or branched chain alkyl radical having from six minus $n$ to twelve minus $n$ carbon atoms inclusive.

As can be seen from the description of the lactones given above, the additives of this invention fall into three basic classes of lactones, i. e., gamma, delta and epsilon lactones.

In incorporating the lactone additive with the oleaginous foodstuff any method can be employed. The simplest procedure is to mix the desired amount of additive with the foodstuff during the preparation of the latter. Alternatively, the lactones can be formed in situ in the foodstuff to be flavored by adding to the foodstuff a compound or mixture of compounds capable of being converted to the lactones. Thus, the sodium salts of the appropriate gamma, or delta hydroxy acid can be added in the case where the foodstuff has sufficient acidity to convert the salts into the hydroxy acids which would then spontaneously or upon heating form the lactones. Also the estolides of the appropriate delta or epsilon acids may be added to the foodstuff to be flavored, since it has now been found that such estolides revert to the lactones when in the foodstuff. It has also been found that the addition of delta or epsilon lactones to the foodstuff also results in the partial conversion of such lactones to the estolides. These estolides form a reserve from which further lactones can be formed should any lactones already present as such disappear from the foodstuff, for example, on heating.

In the above described embodiment of the invention in which the lactones are formed in situ in the foodstuff the acid present in the foodstuff constitutes an agent capable of transforming the precursors of the lactone such as the sodium salts of the hydroxy acid to the lactone. If desired any acid admissible for use in foodstuff may be added to the foodstuff or to a flavoring agent containing the lactone if the foodstuff is insufficiently acid itself to bring about a conversion to the lactone.

In certain cases the lactones need not be introduced into the fat before the latter is used for cooking, since they can be introduced during the manufacture of the dough or while a product is being baked.

When minute quantities of lactones are incorporated into very large quantities of margarine or similar fats, it is advisable to take precautions to ensure their homogeneous distribution. It is, therefore, preferable to incorporate the lactone either as such, or in admixture with other flavoring substances, or in solution, into the margarine or other fat, when the latter is in such a flowing condition as will enable efficient stirring to be carried out without alteration of the final texture thereof. To ensure homogeneous distribution of the lactones, it is further preferable to add them in the form of a solution or emulsion containing 10% or less of the lactones and for the rest, other components or additives to margarine or like foodstuffs.

The amount of lactone to be added to the foodstuff is very small but will vary considerably depending primarily upon the lactone that is to be added. With certain lactones, an amount as small as one part per million, based on the weight of oleaginous foodstuff, will give a good effect, while in the case of other lactones up to 100 parts per million, based on the weight of foodstuff, will be required in order to obtain a measurable improvement in taste and odor.

To illustrate specifically, improved flavors in margarine may be obtained by adding ten parts per million parts of margarine of either the lactone of epsilon-hydroxy octanoic acid, the lactone of epsilon-hydroxy nonanoic acid or the lactone of epsilon-hydroxy decanoic acid.

In the case of margarine, preferably proportions of the gamma lactones in parts per million of margarine to be flavored are within the following ranges:

Lactone of gamma-hydroxy butyric acid_____ 3 to 22
Lactone of gamma-hydroxy decanoic acid____ 1 to 8
Lactone of gamma-hydroxy undecanoic acid___ 1 to 8
Lactone of gamma-hydroxy dodecanoic acid___ 1 to 8

In the case of the lactones of gamma-hydroxy octanoic acid and of gamma-hydroxy nonanoic acid, for example, an amount of 1 to 2 parts per million parts of margarine to be flavored may be used.

A butter-like flavor may also be imparted to the foodstuff, and in particular to margarine, by the incorporation of the lactone of delta-hydroxy decanoic acid, for example, in a proportion of between five and twenty parts per million by weight. This lactone and also the delta-hydroxy nonanoic acid lactone impart a butter-like flavor to margarine as such. When a proportion of between one and five parts per million by weight of the lactone of delta-hydroxy nonanoic acid are incorporated in margarine, both the odor and taste of the margarine are improved, the margarine acquiring a more butter-like flavor. Also when heating the margarine containing the lactone of delta-hydroxy decanoic acid such as when frying foodstuff in margarine or otherwise using the margarine in a foodstuff formed by cooking or baking, the butter-like flavor changes to a flavor similar to that obtained when butter itself is heated under similar conditions. This effect is slight in the case of the lactone of the delta-hydroxy nonanoic acid.

When similar proportions, that is, between five and twenty parts per million by weight, of the lactone of delta-hydroxy undecanoic acid or of delta-hydroxy dodecanoic acid are incorporated in margarine, the improvement in the flavor of the margarine as such is very slight. However, when the margarine is heated such as when frying a foodstuff in margarine or otherwise using the margarine in a foodstuff formed by cooking or baking, a marked flavor, similar to that obtained when butter itself is heated under similar conditions, develops.

For best results when using delta-lactones a mixture containing the lactones of delta-hydroxy nonanoic, decanoic and dodecanoic acids is preferred and in particular a mixture containing the following proportions per million parts of margarine.

0.5 to 1 part of the lactone of delta-hydroxy nonanoic acid 10 to 20 parts of the lactone of delta-hydroxy decanoic acid 10 parts of the lactone of delta-hydroxy dodecanoic acid Good results in margarine are also obtained with the following combinations of the lactones of delta-hydroxy decanoic acid and delta-hydroxy dodecanoic acid, the proportions being in parts per million by weight.

| The lactone of delta-hydroxy decanoic acid | The lactone of delta-hydroxy dodecanoic acid |
| --- | --- |
| 10 | 20 |
| 20 | 20 |
| 20 | 30 |
| 20 | 40 |
| 15 | 30 |
| 10 | 20 |

Often it is satisfactory to use a mixture containing fifteen parts per million by weight of the lactone of delta-hydroxy decanoic acid and thirty parts per million by weight of the lactone of delta-hydroxy dodecanoic acid. With this mixture of lactones not only is the flavor of the margarine as such improved but at the same time an improvement is obtained in the flavor developed on and after heating the margarine.

The lactones of delta-hydroxy octanoic acid, delta-hydroxy tridecanoic acid and delta-hydroxy tetradecanoic acid when used by themselves impart to margarine a flavor which, although of a butter-like character, is not wholly satisfactory. A flavor more closely identical to that of natural butter may be imparted to margarine when any one or more of these lactones, or a cyclo-aliphatic lactone such as the delta-cyclopentyl delta-valero lactone, are used in combination with any one or more of the lactones of the delta-hydroxy nonanoic to delta-hydroxy dodecanoic series of acids.

Any one of the lactones may be added to an oleaginous foodstuff such as margarine, but it is particularly an advantage to use mixtures or blends of several lactones within the scope of Formula I. It has been found that the lactones each impart to or develop in margarine a typical individual flavor although these flavors are all reminiscent of butter.

Another advantage of using a blend of lactones arises from the following circumstances. Some of the lactone additives, e. g., gamma, delta and epsilon lactones having eight or nine carbon atoms, when incorporated in margarine, cause the margarine as such to have a more butter-like flavor, but the improvement on heating the margarine, as when frying or otherwise using the margarine when cooking or baking, is only slightly noticeable. On the other hand, the effect of other lactone additives, e. g., gamma, delta and epsilon lactones having ten to twelve carbon atoms, is much more noticeable when the margarine is heated and the resulting flavor is very similar to that obtained when butter itself is heated under similar conditions.

To obtain a margarine which as such has a butter-like flavor and which also on heating develops the same flavor as butter develops on heating, such as when frying, it is of special advantage to incorporate at least one lactone from each of the following groups:

Group I:
(a) Lactones derived from gamma-hydroxy carboxylic acids containing eight or nine carbon atoms.
(b) Lactones derived from delta-hydroxy carboxylic acids containing from eight to ten carbon atoms.
(c) Lactones derived from epsilon-hydroxy carboxylic acids containing from eight to eleven carbon atoms.

Group II:
(a) Lactones derived from gamma-hydroxy carboxylic acids containing from ten to twelve carbon atoms.
(b) Lactones derived from delta-hydroxy carboxylic acids containing eleven or twelve carbon atoms.
(c) Lactones derived from epsilon-hydroxy carboxylic acids containing from twelve to fourteen carbon atoms.

To simulate the complete aroma of butter it is sometimes advantageous moreover to add to the foodstuffs such as margarine to be flavored, known flavoring substances of other types, for example, diacetyl, acetylmethylcarbinol and lower fatty acids. In other instances, however, it may be preferred, instead of diacetyl and acetylmethylcarbinol, to include four parts of butyric acid per million parts of foodstuffs and also minor quantities of straight chain saturated carboxylic acids containing six and eight carbon atoms. Sweet or sour milk in the range of 2 to 15% of the weight of the foodstuff to be flavored may also be added to foodstuffs prepared according to the present invention. The various flavoring substances including the lactones are preferably mixed in the desired proportions, diluted or emulsified with, for example, edible oil or water or another component of or additive to margarine, and the resultant aromatizing agent incorporated in the margarine or other foodstuff to be flavored. For instance, mixtures containing anti-weeping, anti-spattering and aromatizing substances including lactones, preferably in the proportions desired in the final margarine, are prepared.

Although the invention is specifically described herein with reference to margarine as the foodstuff to be flavored, the flavors of other foodstuffs, such as edible vegetable and animal body fats or oils, emulsions or products containing substantial amounts of these fats, either natural or artificial, confectionery, ice cream or chocolate, are also improved by the incorporation of the lactone additives of this invention.

The above-mentioned delta and epsilon lactones containing from eight to fourteen carbon atoms, which show a striking effect when incorporated in margarine, may be prepared in various ways as disclosed in literature published heretofore.

The preparation of the foodstuffs of this invention is illustrated by the following examples:

*Example 1*

An aromatizing and flavoring mixture is made by dissolving 1 kilogram of the lactone of epsilon-hydroxy nonanoic acid in 9 kg. edible peanut oil.

Fifty grams of this mixture are incorporated in 1,000 kilograms of margarine before or during manufacture of the margarine. The incorporation is preferably made in the raw materials or at a stage of manufacture where the margarine is in such a flowing condition as will enable efficient stirring to be carried out without alteration to its final texture.

Thus, when the margarine is made by the churn-drum multiplex roller-mixer process, incorporation of the aromatizing and flavoring mixture is preferably effected either in the churn or in the mixer. When a continuous kneading and mixing machine of the Gernstenberg type is used, preceded by an emulsifier and cooling drum, the aromatizing and flavoring mixture is preferably added to the emulsifier or to the kneading and mixing machine. When the margarine is made in a Votator, the mixture is preferably added to the unit where the emulsion is subjected to cooling and stirring or at an earlier stage.

The resultant margarine possesses a noticeably more butter-like flavor and aroma than margarine prepared in the same manner but without incorporation of the lactone.

*Example 2*

An aromatizing and flavoring mixture is made by dissolving 15 kilograms of the lactone of epsilon-hydroxy decanoic acid and 30 kilograms of the lactone of epsilon-hydroxy dodecanoic acid in 955 kilograms of edible peanut oil. One kilogram of this aromatizing and flavoring mixture is sufficient for incorporation in 1,000 kilograms of margarine; for example in the manner described in Example 6. Margarine flavored in this manner has a noticeably improved flavor over unflavored margarine from the same batch. The same improved flavor is also noticeable upon heating of the margarine.

*Example 3*

The lactone of epsilon-hydroxy nonanoic acid is packed in a series of capsules, ampoules or other containers, each of which contains an amount of the lactone sufficient for incorporation in a single batch of margarine, for example, a container filled with 5 g. of the lactone may be used in the case of a batch of margarine from 500 to 1,000 kilograms.

*Example 4*

An aromatizing and flavoring mixture is made by dissolving 1 kilogram of the lactone of delta-hydroxy nonanoic acid in 9 kilograms edible peanut oil.

Fifty grams of this mixture are incorporated in 1,000 kilograms of margarine before or during manufacture of the margarine. The incorporation is preferably made in the raw materials or at a stage of manufacture where the margarine is in such a flowing condition as will enable efficient stirring to be carried out without alteration to its final texture.

Margarine flavored by the mixture described above possesses a distinctly improved flavor over unflavored margarine from the same batch.

*Example 5*

An aromatizing and flavoring mixture is made by dissolving 15 kilograms of the lactone of delta-hydroxy decanoic acid and 30 kilograms of the lactone of delta-hydroxy dodecanoic acid in 955 kilograms of edible peanut oil. One kilogram of this aromatizing mixture is sufficient for incorporating in 1,000 kilograms of margarine; for example in the manner described in Example 1. The flavor of the margarine is noticeably improved by the presence of the lactone mixture. Both improved flavor and aroma are also noted on heating of the margarine.

*Example 6*

An aromatizing mixture is prepared by mixing together the following ingredients in the following proportions by weight:

| Flavoring substance: | Parts |
|---|---|
| Butyric acid | 2 |
| Caproic acid | 1 |
| Caprylic acid | 1 |
| Capric acid | 1 |
| Diacetyl | 0.5 |
| Acetylmethyl carbinol | 4 |
| The lactone of delta-hydroxy dodecanoic acid | 10 |
| The lactone of gamma-hydroxy butyric acid | 2 |
| The lactone of gamma-hydroxy octanoic acid | 5 |
| The lactone of epsilon-hydroxy dodecanoic acid | 20 |

This mixture is incorporated in margarine in the amount of 10 parts by weight per million parts of margarine. The flavor of the margarine as such and also when heated is more butter-like than that of ordinary margarine.

Example 7

The lactone of delta-hydroxy nonanoic acid is packed in a series of capsules, ampoules or other containers each of which contains an amount of the lactone sufficient for incorporation in a single batch of margarine, for example, a container filled with 5 grams of the lactone may be used in the case of a batch of margarine from 500 to 1,000 kilograms.

Example 8

In a particular embodiment, a good butter flavor is imparted to margarine containing as aqueous ingredients 95% pasteurized sweet skimmed milk and 5% cultured skimmed milk by incorporation of a flavoring composition as follows:

| Flavoring substance: | Parts |
|---|---|
| Acetic acid | 0.24 |
| Propionic acid | 1.90 |
| Butyric acid | 7.40 |
| Diacetyl | 0.16 |
| Acetylmethyl carbinol | 3.30 |
| The lactone of gamma-hydroxy butyric acid | 4.20 |
| The lactone of gamma-hydroxy octanoic acid | 1.30 |
| The lactone of gamma-hydroxy nonanoic acid | 1.30 |
| The lactone of gamma-hydroxy decanoic acid | 1.30 |
| The lactone of gamma-hydroxy undecanoic acid | 1.30 |
| The lactone of gamma-hydroxy dodecanoic acid | 1.30 |

It has been proposed to add coumarin or melilotol to margarine for improving the aroma, but the result has been found unsatisfactory. The lactones covered by the present invention do not include lactones of hydroxy-carboxylic acids in which an aromatic ring is condensed with the lactone ring. Coumarin or melilotol may, however, be used in combination with the lactones of the present invention.

It is well known that lactones under certain conditions can exist as an equilibrium mixture of the lactone and the corresponding hydroxy acid, especially when in aqueous solution. This equilibrium mixture will be formed starting either from the lactone or the acid. In some instances, the equilibrium at room temperature is so heavily in favor of the lactone that the acid in effect exists as the lactone. In other instances the acid is favored at room temperature, and the lactone is formed in appreciable amounts only at elevated temperatures, but in these instances if the acid is added to the oleaginous material the lactone will be formed under normal cooking conditions.

The appended composition claims cover the addition of a lactone as such or the formation of the lactone in situ in the foodstuff by any of the methods herein described.

We claim:

1. A composition consisting of margarine containing a minor proportion of at least one flavoring substance that imparts a butter-like flavor to the margarine, said flavoring substance including at least one lactone having a lactone ring of from four to six carbon atoms other than a lactone ring condensed to a hydrocarbon ring.

2. A composition consisting of margarine containing a minor proportion of at least one flavoring substance that imparts a butter-like flavor to the margarine, said flavoring substance including at least one lactone having a lactone ring of from four to six carbon atoms other than a lactone ring condensed to a hydrocarbon ring, at least one of the carbon atoms of the lactone ring bearing at least one hydrocarbon radical substituent.

3. A composition in accordance with claim 2 in which the hydrocarbon radical has from one to nine carbon atoms.

4. A composition according to claim 2 in which a hydrocarbon radical is attached to the non-carbonyl carbon atom attached to the lactone oxygen atom.

5. A composition in accordance with claim 4 in which the hydrocarbon radical has from one to nine carbon atoms.

6. A composition consisting of margarine containing a minor proportion of at least one flavoring substance that imparts a butter-like flavor to the margarine, said flavoring substance including at least one lactone having a lactone ring of from four to six carbon atoms other than a lactone ring condensed to a hydrocarbon ring, the carbon atom next to the carbonyl carbon atom bearing at least one hydrocarbon radical substituent.

7. A composition in accordance with claim 6 in which the radical has from one to nine carbon atoms.

8. A composition consisting of margarine containing a minor proportion of at least one flavoring substance that imparts a butter-like flavor to the margarine, said flavoring substance including at least one lactone having a lactone ring of from four to six carbon atoms other than a lactone ring condensed to a hydrocarbon ring, one of the carbon atoms other than the carbonyl carbon atom and the carbon atom adjacent the carbonyl carbon atom bearing at least one hydrocarbon radical substituent.

9. A composition in accordance with claim 8 in which the hydrocarbon radical has from one to nine carbon atoms.

10. A composition consisting of margarine containing a minor proportion of at least one flavoring substance that imparts a butter-like flavor to the margarine, said flavoring substance including a gamma lactone.

11. A composition consisting of margarine containing a minor proportion of at least one flavoring substance that imparts a butter-like flavor to the margarine, said flavoring substance including at least one gamma lactone, the non-carbonyl carbon atom attached to the lactone oxygen atom bearing at least one hydrocarbon radical substituent.

12. A composition in accordance with claim 11 in which the hydrocarbon radical has from four to ten carbon atoms.

13. A composition consisting of margarine containing a minor proportion of at least one flavoring substance that imparts a butter-like flavor to the margarine, said flavoring substance including at least one delta lactone, said lactone having a lactone ring other than a lactone ring condensed to a hydrocarbon ring.

14. A composition consisting of margarine containing a minor proportion of at least one flavoring substance that imparts a butter-like flavor to the margarine, said flavoring substance including at least one delta lactone in which the non-carbonyl carbon atom attached to the lactone oxygen atom bears at least one hydrocarbon radical substituent.

15. A composition in accordance with claim 14 in which the radical has from three to nine carbon atoms.

16. A composition consisting of margarine containing a minor proportion of at least one flavoring substance that imparts a butter-like flavor to the margarine, said flavoring substance including at least one epsilon lactone.

17. A composition consisting of margarine containing a minor proportion of at least one flavoring substance that imparts a butter-like flavor to the margarine, said flavoring substance including at least one epsilon lactone in which the non-carbonyl carbon atom attached to the lactone oxygen atom bears at least one hydrocarbon radical substituent.

18. A composition in accordance with claim 17 in which the hydrocarbon radical has from two to eight carbon atoms.

19. A composition consisting of margarine containing at least a minor proportion of at least one flavoring substance that imparts a butter-like flavor to the margarine, said flavoring substance including gamma-octanoic lactone.

20. A composition consisting of margarine containing a minor proportion of at least one flavoring substance that imparts a butter-like flavor to the margarine, said flavoring substance including delta-decanoic lactone.

21. A composition consisting of margarine containing a minor proportion of at least one flavoring substance that imparts a butter-like flavor to the margarine, said flavoring substance including delta-dodecanoic lactone.

22. A composition consisting of margarine containing a minor proportion of at least two flavoring substances that impart a butter-like flavor to the margarine, said flavoring substances including delta-decanoic lactone and delta-dodecanoic lactone.

23. A composition consisting of margarine containing a minor proportion of at least one flavoring substance that imparts a butter-like flavor to the margarine, said flavoring substance including epsilon-undecanoic lactone.

24. A composition according to claim 2 in which the lactone comprises from one to one hundred parts per million based on the weight of the margarine.

25. A composition consisting of margarine containing a minor proportion of at least four flavoring substances that impart a butter-like flavor to the margarine, said flavoring substances including from three to twenty-two parts per million based on the weight of the margarine of gamma-butyl lactone, one to eight parts per million of gamma-decanoic lactone, one to eight parts per million of gamma-undecanoic lactone, and one to eight parts per million of gamma-dodecanoic lactone.

26. A composition consisting of margarine containing at least one flavoring substance that imparts a butter-like flavor to the margarine, said flavoring substance including from five to twenty parts per million based on the weight of the margarine of delta-decanoic lactone.

27. A composition consisting of margarine containing at least one flavoring substance that imparts a butter-like flavor to the margarine, said flavoring substance including from ten to twenty parts per million based on the weight of the margarine of delta-dodecanoic lactone.

28. A composition consisting of margarine containing at least two flavoring substances that impart a butter-like flavor to the margarine, said flavoring substances including from five to twenty parts per million based on the weight of foodstuffs of delta-decanoic lactone, and from ten to forty per parts per million of delta-dodecanoic lactones.

29. A composition consisting of margarine containing at least two flavoring substances that impart a butter-like flavor to the margarine, said flavoring substances including at least one lactone from the group consisting of gamma lactones containing from eight to nine carbon atoms, delta lactones containing from eight to ten carbon atoms and epsilon lactones containing from eight to eleven carbon atoms, and at least one lactone from the group consisting of gamma lactones containing from ten to twelve carbon atoms, delta lactones containing from eleven to twelve carbon atoms and epsilon lactones containing from ten to fourteen carbon atoms.

30. A method for imparting a butter-like flavor to an oleaginous material other than butter which comprises incorporating therein an additive tending to impart a more butter-like flavor consisting of a material selected from the group consisting of a lactone having a lactone ring of from four to six carbon atoms other than a lactone ring condensed to a hydrocarbon ring and mixtures thereof with another flavoring additive.

31. A method according to claim 30 in which at least one of the carbon atoms of the lactone ring has at least one hydrocarbon radical substituent.

32. A method according to claim 31 in which the non-carbonyl carbon atom attached to the lactone oxygen atom bears a hydrocarbon radical substituent.

33. A flavoring agent for imparting a butter-like flavor to margarine, said agent consisting of margarine and at least one lactone having a lactone ring of from four to six carbon atoms other than a lactone ring condensed to a hydrocarbon ring.

34. A flavoring agent according to claim 33 in which at least one of the carbon atoms of the lactone ring bears at least one hydrocarbon radical substituent.

35. A flavoring agent according to claim 34 in which the non-carbonyl carbon atom attached to the lactone oxygen atom bears a hydrocarbon radical substituent.

36. A method for imparting a butter-like flavor to margarine which comprises incorporating in said margarine a minor proportion of a mixture consisting of (1) at least one lactone precursor capable of being transformed into a lactone having a lactone ring of from four to six carbon atoms other than a lactone ring condensed to a hydrocarbon ring, said lactone precursor being selected from the group consisting of the sodium salts of gamma and delta hydroxy carboxylic acids and the estolides of delta and epsilon hydroxy carboxylic acids and (2) an acid admissible for use in foodstuff.

37. A method according to claim 36 in which the lactone precursor is capable of being transformed into a lactone having a lactone ring of from four to six carbon atoms other than a lactone ring condensed to a hydrocarbon ring in which at least one of the carbon atoms of the lactone ring bears at least one hydrocarbon radical substituent.

38. A method according to claim 36 in which the lactone precursor is capable of being transformed into a lactone having a lactone ring of from four to six carbon atoms other than a lactone ring condensed to a hydrocarbon ring in which the non-carbonyl carbon atom attached to the lactone oxygen atom bears a hydrocarbon radical substituent.

References Cited in the file of this patent

UNITED STATES PATENTS

| | | |
|---|---|---|
| 2,023,877 | Epstein et al. | Dec. 10, 1935 |
| 2,144,906 | Waterman et al. | Jan. 24, 1939 |
| 2,305,620 | Kremers | Dec. 22, 1942 |
| 2,527,785 | Armstrong | Oct. 31, 1950 |

OTHER REFERENCES

"The Chemical Senses," by Moncrieff, Leonard Hill Limited, 17 Stratford Place, W. 1, London, 1944, pages 195–197, 29 and 39.